Sept. 21, 1937.  E. WIEDMANN  2,093,690
HYDRAULIC TRANSMISSION
Filed April 17, 1935  2 Sheets-Sheet 1
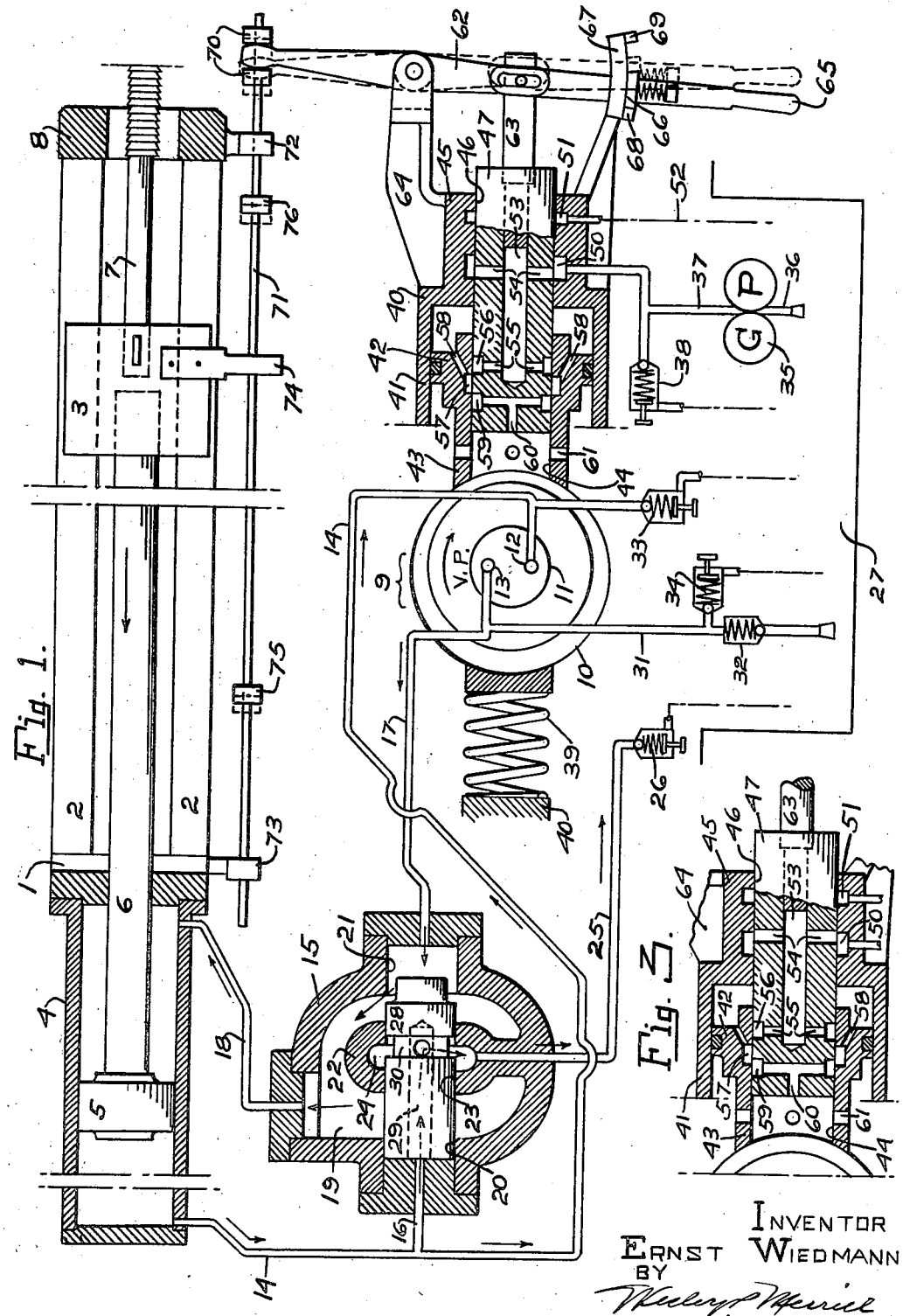
INVENTOR
ERNST WIEDMANN
BY
ATTORNEY.

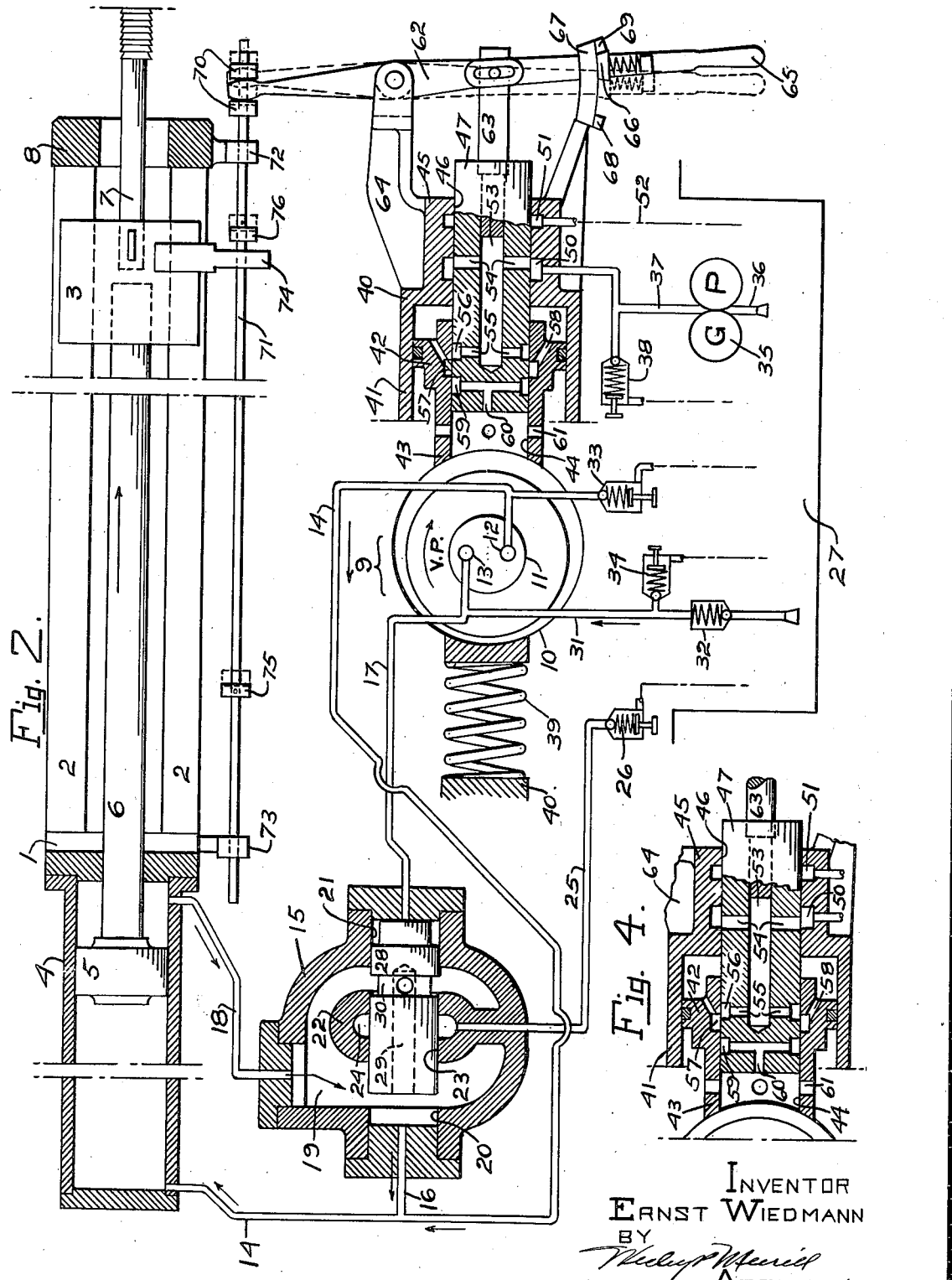

Patented Sept. 21, 1937

2,093,690

UNITED STATES PATENT OFFICE 2,093,690

HYDRAULIC TRANSMISSION

Ernst Wiedmann, Milwaukee, Wis., assignor to The Oilgear Company, Milwaukee, Wis., a corporation of Wisconsin Application April 17, 1935, Serial No. 16,757

14 Claims. (Cl. 60—52)

This invention relates to hydraulic transmissions of the type in which a reciprocating hydraulic motor is provided with a piston having a larger effective pressure area upon one face than upon the other face thereof due either to the piston being attached to one end of a piston rod which extends through one end only of the motor cylinder or to the piston being attached intermediate the ends of a piston rod which extends through both ends of the motor cylinder but which is smaller in cross-sectional area at one side of the piston than at the other side thereof. In either case, the motor cylinder has a larger capacity per unit of length upon one side of the piston than upon the other side thereof, due to the displacement of the piston rod.

The motor is ordinarily operated in one direction on a power stroke by directing the output of a pump to the small capacity end of the cylinder and exhausting liquid from the large capacity end thereof, and it is operated in the opposite direction on an idle or return stroke by directing to the large capacity end of the cylinder both the output of the pump and the liquid expelled from the small capacity end of the cylinder whereby the pump need supply only a volume of liquid equal to the difference between the capacities of the two ends of the cylinder.

The present invention has as an object to provide a transmission of the above character in which a predetermined back pressure is automatically maintained in the cylinder during the working stroke.

Another object is to provide a hydraulic transmission of the above character in which one end or both ends of the cylinder are automatically connected to the pump discharge in response to reversal of flow in the circuit.

Another object is to provide a hydraulic transmission of the above character which is particularly adapted for operating broaching machines.

Other objects and advantages will be apparent from the description hereinafter given of a transmission in which the invention is embodied.

According to the invention in its general aspect and as ordinarily embodied in practice, the transmission is provided with an automatic differential valve which is operated automatically in response to reversal of flow in the circuit to either open both ends of the motor cylinder to the pump discharge to enable the pump to operate the motor in one direction on the differential piston area or to open the small end only of the motor cylinder to the pump discharge and to open the large end of the motor cylinder to both the pump intake and to a resistance valve which causes a back pressure to be created to thereby maintain a low resistance to the operation of the motor and to supercharge the pump at a low pressure.

The transmission is ordinarily employed to reciprocate a tool head or carriage of a machine tool and either the piston or the cylinder may be fixed in a stationary position and the other connected to the machine part to be reciprocated. If the tool head or carriage is relatively short, the cylinder is ordinarily fixed to the frame of the machine and the piston is connected to the tool head or carriage by a rod which extends through one end only of the cylinder. If the carriage is relatively long, such as a planer carriage, the cylinder may be fixed thereto to reciprocate therewith and the piston connected to the frame by a rod which extends through both ends of the cylinder and has a greater cross-sectional area at one side of the piston than at the other side thereof.

The pump which supplies the motive liquid for operating the motor may be reversible to reverse the motor, or it may be unidirectional and the flow of liquid to and from the motor be reversed through a reversing valve in the well known manner.

For the purpose of illustration, the invention has been shown applied to the broaching machine shown schematically in the accompanying drawings in which the views are as follows:

Fig. 1 is a diagram of the hydraulic circuit of the broaching machine and shows the several parts in the positions occupied during the working stroke of the motor.

Fig. 2 is a similar view but showing the parts in the positions occupied during an idle or return stroke of the motor.

Figs. 3 and 4 are cross-sectional views illustrating the operation of the pump control mechanism by means of which the pump is adjusted to deliver liquid in one direction or the other.

The broaching machine has not been illustrated nor described in detail for the reason that machines of this general type are well known and in extensive commercial use.

The broaching machine has its mechanism arranged upon and carried by a frame 1 having two horizontal guides or ways 2 upon which a drawhead 3 is arranged to be reciprocated by a differential hydraulic motor consisting of a cylinder 4, which is fixed to the frame 1, and a piston 5 which is connected to the drawhead 3 by a piston rod 6.

The drawhead 3 is adapted to draw a broaching tool 7 rearward through a face plate 8 which is arranged upon the end of the frame 1 and against which the work to be broached may be placed.

Liquid for operating the motor is supplied by a pump 9 which may be of any suitable construction and be either reversible to reverse the direction of flow in the circuit or it may be unidirectional and the flow in the circuit be reversed through an ordinary reversing valve.

The pump shown is of the general type disclosed in Patent No. 2,074,068 to Walter Ferris and has its displacement varied and its direction of delivery changed by shifting a thrust member or ring 10 transverse to the axis of a valve shaft or pintle 11 having formed therein passages 12 and 13 through which liquid flows to and from the pump cylinders. The patent shows the pump provided with a manually operated screw for shifting the thrust member but, in the present instance, the thrust member 10 is shifted hydraulically.

The pintle passage 12 is connected to the large capacity or head end of the motor cylinder 4 by a pipe 14 which is connected intermediate the ends thereof to the casing of a differential valve 15 by a pipe 16.

The pintle passage 13 is connected by a pipe 17 to the casing of differential valve 15 and through this valve casing and a pipe 18 to the small capacity or gland end of the motor cylinder 4.

The casing of the differential valve 15 encloses a chamber 19 with which the pipes 16 and 17 communicate, respectively, through two bores 20 and 21 formed in the end walls of the valve casing in alinement with each other. The pipe 18 communicates with the chamber 19 through a side wall of the valve casing.

The chamber 19 contains an internal boss 22 which is ordinarily formed integral with the valve casing and is spaced from the walls through which the pipes 16, 17 and 18 communicate with the chamber 19.

The boss 22 has a transverse bore 23 formed therein in alinement with the bores 20 and 21, and an annular groove 24 is formed in the wall of the bore 23. The groove 24 communicates through a pipe 25 with a low pressure resistance valve 26 which discharges into a reservoir 27 containing a supply of oil or other liquid for the pump 9.

The flow of liquid through the differential valve 15 is controlled by a valve plunger 28 which is closely fitted in the bore 23 and provided with an internal passage 29 which extends axially inward from its left end and then radially outward and terminates in a peripheral groove 30 formed in the plunger intermediate the ends thereof.

The plunger 28 is automatically shifted between the position shown in Fig. 1 and the position shown in Fig. 2 by reversal of flow in the circuit. When in the position shown in Fig. 1, the groove 30 in the plunger 28 registers with the groove 24 in the boss 22 and the left end of the plunger extends into and closely fits the bore 20 and prevents flow of liquid between the pipe 16 and the chamber 19 but permits flow of liquid from the pipe 16 through the passage 29 and grooves 30 and 24 to the exhaust pipe 25. When in the position shown in Fig. 2, the plunger 28 cuts off the escape of liquid through the exhaust pipe 25 and has its right end closely fitted in the bore 21 to prevent flow of liquid between the pipe 17 and the chamber 19.

When the pump 9 is discharging through the pintle passage 13, liquid will flow through the pipe 17, move the plunger 28 to the position shown in Fig. 1 and then flow through the bore 21, the chamber 19 and the pipe 18 to the small capacity end of the motor cylinder 4 and move the piston 5 to the left on a working stroke, thereby moving the tool 7 to the left and drawing it through any work which may be supported by the face plate 8.

The piston 5 expels liquid from the large capacity end of the cylinder 4 and, since the volume expelled per unit of piston movement is greater than the volume supplied by the pump to move the piston, a volume sufficient to supply the pump flows through the pipe 14 to the intake passage 12 and the remainder of the expelled liquid flows through the pipe 16, the passage 29, the grooves 30 and 24, the pipe 25 and is exhausted into the reservoir 27 through the resistance valve 26 which causes a low pressure to be created at the intake of the pump and in the discharge end of the cylinder 4, thereby supercharging the pump at a low pressure and greatly decreasing the tendency of the tool to jump in response to variations in tool resistance.

When the pump is discharging through the pintle passage 12, liquid will flow through the pipe 14 to the large capacity end of the cylinder 4 and through the pipe 16 to the bore 20. Since the valve plunger 28 has much less resistance to movement than the piston 5, the liquid will shift it to the position shown in Fig. 2, and then move the piston 5 to the right.

The piston 5 expels liquid from the small capacity end of the cylinder 4 through the pipe 18, the differential valve 15, and the pipes 16 and 14 to the large capacity end of the cylinder 4. Both ends of the cylinder 4 are thus open to pump pressure and the piston 5 is moved forward by the preponderance of force acting upon its rear face which has a larger effective pressure area than its front face due to the displacement of the rod 6. The rate at which the piston is moved forward depends upon the rate of pump delivery and the ratio between the volumetric capacity per unit of length of the front and rear ends of the cylinder 4.

During the forward movement of the piston 5, no liquid is returned to the pump 9 which pump may at this time draw its liquid from the reservoir 27 or be supplied with liquid from an auxiliary pump. As shown, the pump draws liquid from the reservoir 27 through a pipe 31 which is connected to the pipe 17 and has a check valve 32 arranged therein to prevent liquid from being discharged from the pipe 17 into the reservoir 27.

In order to prevent the pump 9 from being overloaded during delivery of liquid in either direction, it is provided with relief valves through which liquid may be discharged after pump pressure exceeds a predetermined maximum. As shown, a high pressure relief valve 33 is connected to the pipe 14 and a high pressure relief valve 34 is connected to the pipe 31 between the check valve 32 and the pipe 17.

Liquid for reversing the pump is supplied by a gear pump 35 which is ordinarily driven in unison with the pump 9 and arranged within the casing thereof according to common practice and as shown in the patent referred to above. The gear pump draws its supply of liquid from the reservoir 27 through a pipe 36 and discharges it into a pipe 37 having connected thereto a low pressure relief valve 38 through which the gear pump discharges and which enables the gear pump to maintain a low pressure in the pipe 37.

As previously explained, the pump 9 is reversed by moving the thrust member 10 to shift its axis from one side of the axis of the pintle 11 to the other side thereof. The thrust member 10 is moved in one direction by a helical compression spring 39 arranged between it and the wall of the pump casing 40, and it is moved in the opposite direction against the resistance of the spring 39 by a hydraulic servo motor consisting primarily of a cylinder 41 and a hollow piston 42. The cylinder 41 is open at its inner end and fixed at its outer end to the pump casing 40, and the piston 42 is fitted therein and provided with a tubular stem 43 which bears against or is connected to the thrust member 10.

Operation of the servo motor 41—42 is controlled by a follow-up valve which, in practice, is of the rotary type but, in order to illustrate the operation of both the follow-up valve and the servo motor in a single view, the follow-up valve is shown as being of the reciprocating type.

As shown, the piston 42 is provided with an axial bore 44 which extends through the stem 43, the cylinder 41 has a boss 45 arranged upon its outer or head end and provided with a bore 46 which extends therethrough in alinement with the bore 44, and a plunger valve 47 is fitted in the bores 44 and 46 to reciprocate therein.

The boss 45 has two internal annular grooves 50 and 51 formed therein around the bore 46. The gear pump discharge pipe 37 is connected to the boss 45 in communication with the groove 50 to supply liquid thereto. Any liquid which may escape from the groove 50 outward along the valve 47 is collected in the groove 51 and drained therefrom through a drain pipe 52 which is connected thereto and discharges into the reservoir 27.

The valve 47 is provided with an axial passage 53 which has one of its ends in communication at all times with the groove 50 through a plurality of radial ducts 54 formed in the valve. The other end of the passage 53 is connected by a plurality of radial ducts 55 to an annular supply groove 56 formed in the peripheral surface of the valve 47. Consequently, the groove 56 is supplied at all times with liquid from the gear pump 35.

The supply groove 56 is adapted to be brought into communication with an annular groove 57 which is formed in the piston 42 around the bore 44 and communicates with the outer or closed end of the cylinder 41 through a plurality of ducts 58 extending outward through the piston 42.

In the normal relative positions of the piston 42 and the valve 47, the groove 57 lies between the supply groove 56 and an annular drain groove 59 which is formed in the peripheral surface of the valve 47 and communicates with the open end of the bore 44 through drain ducts 60 which extend radially inward from the groove 59 and then axially through the inner end of the valve 47. Liquid exhausted through the groove 59 and the ducts 60 into the bore 44 may drain therefrom through openings 61 formed in the wall of the stem 43.

The width of the groove 57 is ordinarily equal to the distance between the grooves 56 and 59. That is, in the normal positions of the valve 47 and the piston 42, the edges of the groove 57 are ordinarily in alinement, respectively, with the adjacent edges of the grooves 56 and 59 so that there is no communication between the groove 57 and the groove 56 or the groove 59 but a slight movement of the valve 47 in one direction or the other will open the groove 57 to the groove 56 or to the groove 59.

Movement of the valve 47 toward the left opens the supply groove 56 to the groove 57, as shown in Fig. 4, and liquid may flow therethrough and through the ducts 58 to the head end of the cylinder 41 and move the piston 42 and the thrust member 10 toward the left against the resistance of the spring 39. When the piston has moved exactly the same distance that the valve was moved, the groove 57 passes out of registry with the groove 56 thereby stopping any further movement of the piston by cutting off the supply of driving liquid and trapping the liquid then contained in the cylinder 41. The liquid trapped in the cylinder 41 then holds the piston 42 and the thrust member 10 stationary against the action of the spring 39.

Movement of the valve 47 toward the right opens the drain groove 59 to the groove 57, as shown in Fig. 3, and liquid may escape therethrough and through the ducts 60 from the head end of the cylinder 41 and permit the spring 39 to move the piston 42 and the thrust member 10 toward the right. When the piston has moved the same distance that the valve was moved, the groove 57 passes out of registry with the groove 59 thereby stopping any further movement of the piston by cutting off the escape of liquid and trapping the liquid then remaining in the cylinder 41. The liquid trapped in the cylinder 41 then holds the piston 42 and the thrust member 10 stationary against the action of the spring 39.

In the mechanism shown, the valve 47 is shifted by means of a lever 62 which is connected to the stem 63 of the valve 47 by a pin and slot connection and pivoted upon a bracket 64 carried by the pump casing 40.

The lever 62 is provided at one of its ends with a handle 65 and near that end with a friction block 66 which slides upon a quadrant 67 between two stops 68 and 69 fixed thereon in adjusted positions. Since the piston 42 moves through exactly the same distance that the valve 47 is moved, the stops 68 and 69 determine the distance that the axis of the thrust member may be offset from the axis of the pintle 11 and consequently determine the rate at which the pump 9 will deliver liquid in each direction.

The other end of the lever 62 is bifurcated and arranged between two collars 70 fixed on a control rod 71 which is slidably supported in bearings 72 and 73 carried by the frame 1 of the machine.

The rod 71 is shifted in the bearings by an actuator 74 which is carried by the drawhead 3 and encircles the rod 71 between two collars 75 and 76 fixed thereon in adjusted positions, the distance between the collars 75 and 76 determining the length of stroke of the machine.

In the machine shown, the pump is manually adjusted to start the machine in each direction and is automatically adjusted to stop the machine at the end of the working stroke and at the end of the idle stroke. This arrangement is shown for the reason that it is often necessary to remove the work before the broaching tool is returned to its starting position. If the transmission is to be applied to a machine which should be reversed at either or both ends of its stroke, any of the well known carry-over mechanisms may be employed to shift the control valve far enough to cause the pump to be reversed.

Assuming that the several parts are in the positions shown in Fig. 1, the thrust member 10 has been shifted until its axis is offset to the left from the axis of the pintle 11, the thrust member is being held in that position by the liquid trapped in the cylinder 41, the pump 9 is delivering liquid through the passage 13 into the pipe 17, and the plunger 28 of the differential valve 15 has been moved by this liquid from the position shown in Fig. 2 to the position shown in Fig. 1.

Liquid from the pump 9 is flowing through the pipe 17, the differential valve 15 and the pipe 18 to the small capacity end of the cylinder 4 and moving the piston 5 toward the left to thereby draw the tool 7 rearward through any work on the face plate 8, and the piston 5 is ejecting liquid from the large capacity end of the cylinder 4 into the pipe 14.

Since liquid is being ejected from the large capacity end of the cylinder 4 at a faster rate than liquid is being delivered by the pump, enough of the ejected liquid to supply the pump flows through the pipe 14 to the intake 12 of the pump and the remainder is discharged through the pipe 16, the passage 29 and grooves 30 and 24 of the differential valve 15, the pipe 25 and the resistance valve 26 which maintains a low pressure at the intake of the pump and in the discharge end of the motor to supercharge the pump at a low pressure and to reduce the tendency of the tool 7 to jump in response to variations in tool resistance.

The piston 5 continues to move toward the left until the actuator 74 engages the collar 75 and shifts it to the left to the position shown in dotted lines, thereby shifting the rod 71 to the left and moving the lever 62 to its central or neutral position as shown in dotted lines.

As the lever 62 moves to the dotted line position of Fig. 1, it shifts the valve 47 to the right to open the groove 57 to the groove 59 as shown in Fig. 3. Liquid may now escape from the cylinder 41 through the ducts 58, the grooves 57 and 59, and the ducts 60, thereby permitting the spring 39 to move the thrust member 10 and the piston 42 to the right until the groove 57 passes out of communication with the groove 59 at which time the pump 9 is at zero stroke and the machine comes to rest.

To start the machine on an idle stroke, the lever 62 is manually moved from its neutral position toward the right until the block 66 engages the stop 69 as shown in Fig. 2, thereby shifting the valve 47 farther toward the right and again opening the groove 57 to the groove 59 as shown in Fig. 3. Liquid may now escape from the cylinder 41 and permit the spring 39 to move the thrust member 10 and the piston 42 toward the right until the groove 57 passes out of communication with the groove 59 at which time the pump 9 is discharging liquid through the passage 12 at a rate determined by the position of the stop 69.

Pressure created by the pump extends through the pipes 14 and 16 and shifts the plunger 28 of the differential valve 15 from the position shown in Fig. 1 to the position shown in Fig. 2.

Liquid discharged by the pump may now flow through the pipe 14 to the large capacity end of the motor and move the piston 5 toward the right. The piston ejects liquid from the small capacity end of the motor through the pipe 18, the differential valve 15, and the pipes 16 and 14 to the large capacity end of the motor to enable the pump to drive the piston 5 toward the right at high speed. During this movement of the piston, the pump 9 draws its supply of liquid from the reservoir 7 through the suction pipe 31 and the check valve 32.

The piston 5 continues to move toward the right until the actuator 74 engages the collar 76 and shifts it to the right to the position shown in dotted lines in Fig. 2, thereby shifting the rod 71 to the right and moving the lever 62 to its central or neutral position as shown in dotted lines.

As the lever 62 moves to the dotted line position of Fig. 2, it shifts the valve 47 to the left to open the groove 57 to the groove 56 as shown in Fig. 4. Liquid from the gear pump 35 may now flow through the control valve and the ducts 58 to the cylinder 41 and move the piston 42 and the thrust member 10 toward the left until the groove 57 passes out of communication with the groove 56 at which time the pump 9 is at zero stroke and the machine comes to rest.

To start the machine on a working stroke, the lever 62 is manually moved from its neutral position toward the left until the block 66 engages the stop 68 as shown in Fig. 1, thereby shifting the valve 47 farther to the left and again opening the groove 57 to the groove 56 as shown in Fig. 4. Liquid from the gear pump may now enter the cylinder 41 and move the piston 42 and the thrust member 10 toward the left until the groove 57 passes out of communication with the groove 56 at which time the pump 9 is discharging liquid through the passage 13 at a rate determined by the position of the stop 68 and driving the piston 5 toward the left on a working stroke as previously explained.

The invention herein set forth is susceptible of various modifications and adaptations without departing from the scope thereof as hereafter claimed.

The invention is hereby claimed as follows:

1. A hydraulic transmission, comprising a hydraulic circuit, a pump connected into said circuit for circulating motive liquid therethrough, means for reversing the direction of flow in said circuit, a reciprocating hydraulic motor connected into said circuit and comprising a piston and a cylinder, said piston having a larger effective area upon one of its ends than upon its other end whereby one end of said motor has a larger volumetric capacity than the other end thereof, a resistance valve connected to said circuit for the discharge of liquid therefrom, and differential valve means automatically operable in response to reversal of flow in said circuit connected into said circuit for controlling communication between said pump and said motor and between said motor and said resistance valve, flow of liquid in one direction conditioning said valve means to establish communication between the discharge side of said pump and both ends of said motor to thereby cause said motor to operate in one direction, and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid.

2. A hydraulic transmission, comprising a hydraulic circuit, a reversible pump connected into said circuit for circulating motive liquid therethrough, means for adjusting said pump to reverse the direction of flow in said circuit, a reciprocating hydraulic motor connected into said circuit and comprising a piston and a cylinder, said piston having a larger effective area upon one of its ends than upon its other end whereby one end of said motor has a larger volumetric capacity than the other end thereof, a resistance valve connected to said circuit for the discharge of liquid therefrom, and differential valve means automatically operable in response to reversal of flow in said circuit connected into said circuit for controlling communication between said pump and said motor and between said motor and said resistance valve, flow of liquid in one direction conditioning said valve means to establish communication between the discharge side of said pump and both ends of said motor to thereby cause said motor to operate in one direction, and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid.

3. A hydraulic transmission, comprising a hydraulic circuit, a reversible pump connected into said circuit for circulating motive liquid therethrough, means for reversing said pump to thereby reverse the direction of flow in said circuit, a reciprocating hydraulic motor connected into said circuit and comprising a piston and a cylinder, said piston having a larger effective area upon one of its ends than upon its other end whereby one end of said motor has a larger volumetric capacity than the other end thereof, a resistance valve connected to said circuit for the discharge of liquid therefrom, differential valve means automatically operable in response to reversal of flow in said circuit connected into said circuit for controlling communication between said pump and said motor and between said motor and said resistance valve, flow of liquid in one direction conditioning said valve means to establish communication between the discharge side of said pump and both ends of said motor to thereby cause said motor to operate in one direction, and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid, and means set in action by said motor for operating said reversing means.

4. A hydraulic transmission, comprising a hydraulic circuit, a reversible pump connected into said circuit for circulating motive liquid therethrough, means for reversing said pump to reverse the direction of flow in said circuit, a reciprocating hydraulic motor connected into said circuit and comprising a piston and a cylinder, said piston having a larger effective area upon one of its ends than upon its other end whereby one end of said motor has a larger volumetric capacity than the other end thereof, a resistance valve connected to said circuit for the discharge of liquid therefrom, differential valve means automatically operable in response to reversal of flow in said circuit connected into said circuit for controlling communication between said pump and said motor and between said motor and said resistance valve, flow of liquid in one direction conditioning said valve means to establish communication between the discharge side of said pump and both ends of said motor to thereby cause said motor to operate in one direction, and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid, manual means for operating said reversing means to adjust said pump to deliver liquid in either direction, and means set in action by said motor for operating said reversing means to reduce pump displacement to zero.

5. The combination, with a reciprocating member, of a hydraulic circuit, a differential hydraulic motor connected into said circuit and comprising a piston and a cylinder one of which is fastened in a stationary position and the other of which is connected to said member, said piston having a larger effective area upon one of its ends than upon the other end whereby one end of said motor has a larger volumetric capacity than the other end thereof, a pump connected into said circuit for delivering liquid to said motor to drive the same, means for reversing the direction of flow in said circuit to thereby drive said motor in opposite directions, a differential valve casing connected into said circuit in communication with both sides of said pump and both ends of said motor, a resistance valve connected to said casing to permit liquid to be discharged from said circuit, and valve means automatically operable in response to reversal of flow in said circuit arranged in said casing for controlling the flow of liquid through said circuit and said resistance valve, flow of liquid in one direction in said circuit conditioning said valve means to establish communication between the discharge side of said pump and both ends of said motor to thereby cause said motor to operate in one direction and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid.

6. The combination, with a reciprocating member, of a hydraulic circuit, a differential hydraulic motor for reciprocating said member connected into said circuit and comprising a piston and a cylinder one of which is fastened in a stationary position and the other of which is connected to said member, said piston having a larger effective area upon one of its ends than upon the other end whereby one end of said motor has a larger volumetric capacity than the other end thereof, a pump connected into said circuit for delivering liquid to said motor to drive the same, means for reversing the direction of flow in said circuit to thereby drive said motor in opposite directions, means responsive to movement of said member for operating said reversing means, a differential valve casing connected into said circuit in communication with both sides of said pump and both ends of said motor, a resistance valve connected to said casing to permit liquid to be discharged from said circuit, and valve means automatically operable in response to reversal of flow in said circuit arranged in said casing for controlling the flow of liquid through said circuit and said resistance valve, flow of liquid in one direction in said circuit conditioning said valve means to establish communication between the discharge side of said pump and both ends of said motor to thereby cause said motor to operate in one direction and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid.

7. The combination, with a reciprocating member, of a hydraulic circuit, a differential hydraulic motor connected into said circuit and comprising a piston and a cylinder one of which is fastened in a stationary position and the other of which is connected to said member, said piston having a larger effective area upon one of its ends than upon the other end whereby one end of said motor has a larger volumetric capacity than the other end thereof, a reversible pump connected into said circuit for delivering liquid to said motor to drive the same, means for reversing said pump to thereby drive said motor in opposite directions, a differential valve casing connected into said circuit in communication with both sides of said pump and both ends of said motor, a resistance valve connected to said casing to permit liquid to be discharged from said circuit, and valve means automatically operable in response to reversal of flow in said circuit arranged in said casing for controlling the flow of liquid through said circuit and said resistance valve, flow of liquid in one direction in said circuit conditioning said valve means to establish communication between the discharge side of said pump and both ends of said motor to thereby cause said motor to operate in one direction and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid.

8. The combination, with a reciprocating member, of a hydraulic circuit, a differential hydraulic motor connected into said circuit and comprising a piston and a cylinder one of which is fastened in a stationary position and the other of which is connected to said member, said piston having a larger effective area upon one of its ends than upon the other end whereby one end of said motor has a larger volumetric capacity than the other end thereof, a reversible pump connected into said circuit for delivering liquid to said motor to drive the same, means for reversing said pump to thereby drive said motor in opposite directions, means responsive to movement of said member for operating said reversing means, a differential valve casing connected into said circuit in communication with both sides of said pump and both ends of said motor, a resistance valve connected to said casing to permit liquid to be discharged from said circuit, and valve means automatically operable in response to reversal of flow in said circuit arranged in said casing for controlling the flow of liquid through said circuit and said resistance valve, flow of liquid in one direction in said circuit conditioning said valve means to establish communication between the discharge side of said pump and both ends of said motor to thereby cause said motor to operate in one direction and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid.

9. The combination, with a reciprocating member, of a hydraulic circuit, a differential hydraulic motor connected into said circuit and comprising a piston and a cylinder one of which is fastened in a stationary position and the other of which is connected to said member, said piston having a larger effective area upon one of its ends than upon the other end whereby one end of said motor has a larger volumetric capacity than the other end thereof, a reversible pump connected into said circuit for delivering liquid to said motor to drive the same, means for reversing said pump to thereby drive said motor in opposite directions, a differential valve casing connected into said circuit in communication with both sides of said pump and both ends of said motor, a resistance valve connected to said casing to permit liquid to be discharged from said circuit, valve means automatically operable in response to reversal of flow in said circuit arranged in said casing for controlling the flow of liquid through said circuit and said resistance valve, flow of liquid in one direction in said circuit conditioning said valve means to establish communication between the discharge side of said pump and both ends of said motor to thereby cause said motor to operate in one direction and flow of liquid in the opposite direction conditioning said valve means to direct liquid from the discharge side of said pump to the small capacity end only of said motor and to permit the liquid exhausted from the large capacity end of said motor to be in part returned to the intake side of said pump and in part discharged through said resistance valve to thereby cause said motor to operate in the opposite direction and said pump to be supercharged by said exhaust liquid, manual means for operating said reversing means to adjust said pump to deliver liquid in either direction, and means set in action by said motor for operating said reversing means to reduce pump displacement to zero.

10. A broaching machine, comprising a frame, a drawhead slidable upon said frame, a hydraulic cylinder fixed to said frame, a piston fitted in said cylinder and connected to said drawhead by a piston rod extending through one end only of said cylinder, a pump for supplying liquid to said motor to reciprocate said piston, fluid channels connecting said pump to said motor and forming therewith a hydraulic circuit, means for reversing the direction of flow in said circuit, a resistance valve connected to said circuit for the discharge of liquid therefrom, and differential valve means connected into said circuit and automatically operable in response to reversal of the flow of liquid in said circuit to establish communication between the discharge side of said pump and one end or both ends of said cylinder and to control communication between said resistance valve and said circuit, flow of liquid in one direction causing said valve to establish communication between the discharge side of said pump and both ends of said cylinder to thereby cause relative movement in one direction between said piston and said cylinder, and flow of liquid in the opposite direction causing said valve r eans to permit liquid to flow from the discharge side of said pump to the rod end only of said cylinder, thereby causing slower relative movement between said piston and said cylinder in the opposite direction and the liquid discharged from the large capacity end of said cylinder to be in part delivered to the intake side of said pump and in part exhausted through said relief valve to thereby supercharge said pump and to maintain a back pressure in said cylinder.

11. A broaching machine, comprising a frame, a drawhead slidable upon said frame, a hydraulic cylinder fixed to said frame, a piston fitted in said cylinder and connected to said drawhead by a piston rod extending through one end only of said cylinder, a reversible pump for supplying liquid to said motor to reciprocate said piston, fluid channels connecting said pump to said motor and forming therewith a hydraulic circuit, means for reversing said pump to thereby reverse the direction of flow in said circuit, a resistance valve connected to said circuit for the discharge of liquid therefrom, and differential valve means connected into said circuit and automatically operable in response to reversal of the flow of liquid in said circuit to establish communication between the discharge side of said pump and one end or both ends of said cylinder and to control communication between said resistance valve and said circuit, flow of liquid in one direction causing said valve to establish communication between the discharge side of said pump and both ends of said cylinder to thereby cause relative movement in one direction between said piston and said cylinder, and flow of liquid in the opposite direction causing said valve means to permit liquid to flow from the discharge side of said pump to the rod end only of said cylinder, thereby causing slower relative movement between said piston and said cylinder in the opposite direction and the liquid discharged from the large capacity end of said cylinder to be in part delivered to the intake side of said pump and in part exhausted through said relief valve to thereby supercharge said pump and to maintain a back pressure in said cylinder.

12. A broaching machine, comprising a frame, a drawhead slidable upon said frame, a hydraulic cylinder fixed to said frame, a piston fitted in said cylinder and connected to said drawhead by a piston rod extending through one end only of said cylinder, a pump for supplying liquid to said motor to reciprocate said piston, fluid channels connecting said pump to said motor and forming therewith a hydraulic circuit, means for reversing the direction of flow in said circuit, a resistance valve connected to said circuit for the discharge of liquid therefrom, differential valve means connected into said circuit and automatically operable in response to reversal of the flow of liquid in said circuit to establish communication between the discharge side of said pump and one end or both ends of said cylinder and to control communication between said resistance valve and said circuit, flow of liquid in one direction causing said valve to establish communication between the discharge side of said pump and both ends of said cylinder to thereby cause relative movement in one direction between said piston and said cylinder, and flow of liquid in the opposite direction causing said valve means to permit liquid to flow from the discharge side of said pump to the rod end only of said cylinder, thereby causing slower relative movement between said piston and said cylinder in the opposite direction the liquid discharged from the large capacity end of said cylinder to be in part delivered to the intake side of said pump and in part exhausted through said relief valve to thereby supercharge said pump and to maintain a back pressure in said cylinder, and means set in action by said piston for operating said reversing means.

13. A broaching machine, comprising a frame, a drawhead slidable upon said frame, a hydraulic cylinder fixed to said frame, a piston fitted in said cylinder and connected to said drawhead by a piston rod extending through one end only of said cylinder, a reversible pump for supplying liquid to said motor to reciprocate said piston, fluid channels connecting said pump to said motor and forming therewith a hydraulic circuit, means for reversing said pump to thereby reverse the direction of flow in said circuit, a resistance valve connected to said circuit for the discharge of liquid therefrom, differential valve means connected into said circuit and automatically operable in response to reversal of the flow of liquid in said circuit to establish communication between the discharge side of said pump and one end or both ends of said cylinder and to control communication between said resistance valve and said circuit, flow of liquid in one direction causing said valve to establish communication between the discharge side of said pump and both ends of said cylinder to thereby cause relative movement in one direction between said piston and said cylinder, and flow of liquid in the opposite direction causing said valve means to permit liquid to flow from the discharge side of said pump to the rod end only of said cylinder, thereby causing slower relative movement between said piston and said cylinder in the opposite direction the liquid discharged from the large capacity end of said cylinder to be in part delivered to the intake side of said pump and in part exhausted through said relief valve to thereby supercharge said pump and to maintain a back pressure in said cylinder, and means set in action by said piston for operating said reversing means.

14. A broaching machine, comprising a frame, a drawhead slidable upon said frame, a hydraulic cylinder fixed to said frame, a piston fitted in said cylinder and connected to said drawhead by a piston rod extending through one end only of said cylinder, a reversible pump for supplying liquid to said motor to reciprocate said piston, fluid channels connecting said pump to said motor and forming therewith a hydraulic circuit, means for reversing said pump to thereby reverse the direction of flow in said circuit, a resistance valve connected to said circuit for the discharge of liquid therefrom, differential valve means connected into said circuit and automatically operable in response to reversal of the flow of liquid in said circuit to establish communication between the discharge side of said pump and one end or both ends of said cylinder and to control communication between said resistance valve and said circuit, flow of liquid in one direction causing said valve to establish communication between the discharge side of said pump and both ends of said cylinder to thereby cause relative movement in one direction between said piston and said cylinder, and flow of liquid in the opposite direction causing said valve means to permit liquid to flow from the discharge side of said pump to the rod end only of said cylinder, thereby causing slower relative movement between said piston and said cylinder in the opposite direction and the liquid discharged from the large capacity end of said cylinder to be in part delivered to the intake side of said pump and in part exhausted through said relief valve to thereby supercharge said pump and to maintain a back pressure in said cylinder, manual means for operating said reversing means to adjust said pump to deliver liquid in either direction, and means set in action by said piston for operating said reversing means to reduce pump displacement to zero.

ERNST WIEDMANN.